United States Patent
Ji et al.

(10) Patent No.: US 9,045,646 B2
(45) Date of Patent: *Jun. 2, 2015

(54) INSULATING COMPOSITION FOR SUBSTRATE, AND PREPREG AND SUBSTRATE USING THE SAME

(71) Applicant: Samsung Electro-Mechanics Co., Ltd., Suwon (KR)

(72) Inventors: Soo Young Ji, Suwon (KR); Seung Hwan Kim, Suwon (KR); Suk Jin Ham, Suwon (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 155 days.

This patent is subject to a terminal disclaimer.

(21) Appl. No.: 13/801,087

(22) Filed: Mar. 13, 2013

(65) Prior Publication Data

US 2013/0281575 A1 Oct. 24, 2013

(30) Foreign Application Priority Data

Apr. 20, 2012 (KR) ........................ 10-2012-0041538

(51) Int. Cl.
| C09D 5/00 | (2006.01) |
| C08J 5/24 | (2006.01) |
| C08K 5/057 | (2006.01) |
| C09D 179/08 | (2006.01) |
| C08L 79/08 | (2006.01) |
| H01B 3/40 | (2006.01) |
| H01B 3/44 | (2006.01) |

(52) U.S. Cl.
CPC ... *C09D 5/00* (2013.01); *C08J 5/24* (2013.01); *C08K 5/057* (2013.01); *C09D 179/085* (2013.01); *C08L 79/085* (2013.01); *H01B 3/40* (2013.01); *H01B 3/448* (2013.01)

(58) Field of Classification Search
CPC .............. C09D 5/00; C08K 7/02; C08K 3/20; C09J 5/24
USPC ........................................................ 523/455
See application file for complete search history.

(56) References Cited

U.S. PATENT DOCUMENTS 5,120,384 A * 6/1992 Yoshimitsu et al. .......... 156/242
2010/0283004 A1 * 11/2010 Lee et al. ................. 252/299.65

FOREIGN PATENT DOCUMENTS

| JP | 5-291712 | 11/1993 |
| JP | 2002-76545 | 3/2002 |
| JP | 2009-7406 | 1/2009 |
| WO | WO 2012/046069 | * 4/2012 |

* cited by examiner

*Primary Examiner* — Doris Lee (57) ABSTRACT

The present invention relates to an insulating composition for a substrate including a soluble liquid crystal thermosetting oligomer, a metal alkoxide, a graphene oxide, and a short fiber, and an insulating material and a substrate using the same. The insulating composition in accordance with the present invention can effectively reduce the coefficient of thermal expansion by the addition of the metal alkoxide and the graphene oxide. Therefore, it is possible to provide a substrate material with greatly increased strength and rigidity by the addition of the short fiber as well as to manufacture a substrate with improved thermal stability by using the insulating composition in accordance with the present invention as an insulating material of the substrate to minimize dimensional deformation due to heat.

17 Claims, 7 Drawing Sheets

FIG. 1

- PRIOR ART -

FIG. 2

- PRIOR ART -

FIG. 3

- PRIOR ART -

FIG. 4

- PRIOR ART -

SURFACE FUNCTIONAL GROUP STRUCTURE

INSULATING COMPOSITION FOR SUBSTRATE, AND PREPREG AND SUBSTRATE USING THE SAME

CROSS-REFERENCE TO RELATED APPLICATIONS

This application claims the foreign priority benefit of Korean Patent Application No. 10-2012-0041538 filed on Apr. 20, 2012, in the Korean Intellectual Property Office, the disclosure of which is incorporated herein by reference.

BACKGROUND OF THE INVENTION

1. Field of the Invention

The present invention relates to an insulating composition for a substrate, and a prepreg and a substrate using the same.

2. Description of the Related Art

With the advance of electronic devices, printed circuit boards are becoming lighter, thinner, and smaller day by day. In order to meet these requirements, wiring of a printed circuit board is becoming more complicated and highly-densified. Therefore, electrical, thermal, and mechanical stability of a substrate serve as important factors. Among them, particularly, the coefficient of thermal expansion (CTE) is one of the important factors that affect reliability in manufacture of the substrate.

A printed circuit board chiefly comprises copper serving as circuit wiring and a polymer serving as an interlayer insulator. The CTE of the polymer constituting an insulation layer is much higher than that of copper. In order to overcome this difference, the CTE of the polymer constituting the insulation layer is reduced by impregnating the polymer into a woven glass fiber or adding an inorganic filler to the polymer.

Generally, as the amount of the inorganic filler is increased, the CTE of the insulating layer is reduced, but there is a limit in reducing the CTE of the insulating layer indefinitely due to a manufacturing process of the substrate.

Further, in order to meet the requirement for highly-densified fine patterns, surface roughness of the insulating layer is also considered as an important factor. The size of the inorganic filler added in order to secure the surface roughness is gradually reduced. However, as the size of the inorganic filler is reduced, the problem with the uniform dispersibility of the inorganic filler is on the rise, and, particularly, the problem that the nanoscale filler must be uniformly dispersed is also on the rise.

Figure 1:
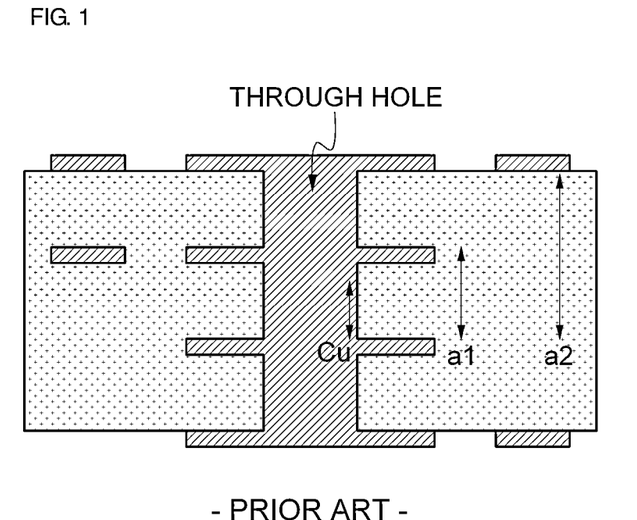
FIG. 1 shows a portion of a structure of a typical printed circuit board.

FIG. 1 shows a structure of a printed circuit board which comprises copper serving as circuit wiring and a polymer serving as an interlayer insulating layer. The CTE of the copper (Cu) circuit wiring is 10 to 20 ppm/° C., and the CTE a1 of a typical polymer material used in the insulating layer is 50 to 80 ppm/° C. Since the CTE of the polymer is greatly increased above a glass transition temperature (Tg, 150 to 200° C.), the CTE a2 at high temperature reaches 150 to 180 ppm/° C.

Further, heat is rapidly supplied to a PCB for 3 to 5 seconds at a temperature of about 280° C. when mounting components such as semiconductors on the PCB. At this time, cracks of a circuit formed by plating and deformation of the substrate may occur due to a big difference in the CTE between the circuit and the insulating layer.

Ultimately, a polymer material of the insulating layer, which has a CTE equal to those of copper as circuit wiring and semiconductor chips placed on the substrate, is required. However, materials obtained by adjusting the kind and amount of a polymer and an inorganic filler, which constitute an existing insulating layer, are difficult to satisfy the requirement for complicated and highly-densified wirings of the printed circuits.

Figure 2:
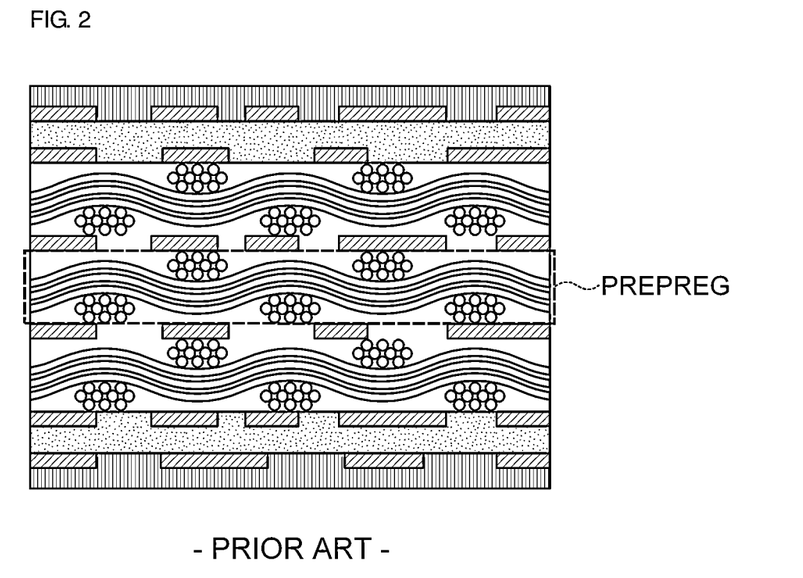
FIG. 2 shows a prepreg type insulating layer for a printed circuit board.

Meanwhile, there are two types of polymer composite insulating materials which are used in the insulating layer for a printed circuit board. One is a prepreg prepared by impregnating the polymer composite insulating layer into a woven glass fabric or a woven glass cloth to semi-cure the polymer composite insulating layer at a temperature below a glass transition temperature Tg of the material as in FIG. 2.

Figures 3, 4:
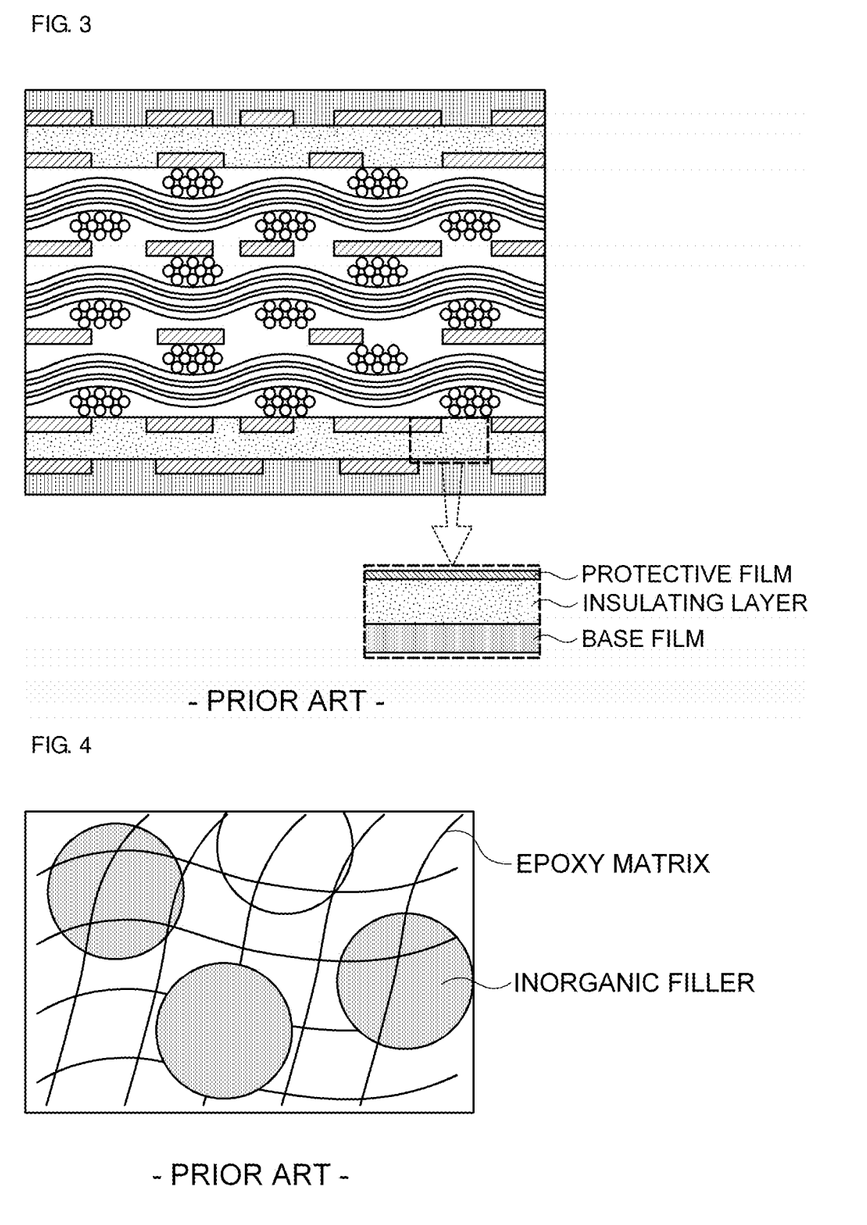
FIG. 3 shows a film type insulating layer for a printed circuit board.
FIG. 4 is a conceptual view showing a state in which an inorganic filler is added to an epoxy matrix in accordance with the prior art.

The other is a film manufactured using only the polymer composite insulating material without including the woven glass fabric as in FIG. 3. The latter method blends a polymer composite insulating material, an inorganic filler, a hardener, a solvent, additives, a curing accelerator, and so on at an optimal blending ratio and mixes, disperses, and casts the blend to form a film.

A main polymer composite insulating material, which forms an insulating layer of a conventional printed circuit board, is an epoxy resin. The CTE of the epoxy resin itself is about 70 to 100 ppm/° C. In order to reduce the CTE of the epoxy resin, the epoxy resin is impregnated into a woven glass fiber or a large amount of inorganic filler with a low CTE are added to an epoxy matrix to implement a low CTE as shown in FIG. 4.

The CTE of the epoxy resin is linearly reduced in proportion to the amount of the added fillers. However, when a large amount of the inorganic filler are added to reduce the CTE, dispersibility of the inorganic filler in the matrix is greatly deteriorated so that aggregation of the filler occurs and surface roughness of the printed circuit board is much increased. Further, since viscosity of the epoxy is rapidly increased, there are many difficulties in forming products. Especially, in case of a product having a multilayer structure such as an insulating film used in the printed circuit board, there are many cases where interlayer bonding is impossible.

For these limitations, it is required to reduce the CTE of the epoxy resin itself and simultaneously improve an effect by introducing a critical amount of inorganic filler which can secure lamination processability. For example, the epoxy resins having different structures are mixed to reduce the CTE of the epoxy resin itself. At this time, the component and composition of each epoxy resin are important.

Further, since the CTE of the epoxy resin is greatly affected by the kind, size, and shape of the inorganic filler as well as the amount of the inorganic filler, miniaturization, that is, nanoscaling of the added inorganic filler is required to implement a hyperfine pattern. However, although a nanoscale inorganic filler is added, it is still difficult to obtain a homogeneous film through uniform dispersion of the filler.

Therefore, the development of a material of an insulating layer of a printed circuit board with a low CTE is needed. Further, as thinning of a substrate is in progress, a substrate with increased strength and rigidity is needed. The development of a material of an insulating layer which satisfies these two characteristics is needed.

RELATED ART DOCUMENT

Patent Document

Patent Document 1: JP 2002-076545A

SUMMARY OF THE INVENTION

The present invention has been invented in order to overcome the above-described problems and it is, therefore, an object of the present invention to provide an insulating composition for a substrate having a low coefficient of thermal expansion and excellent strength and rigidity at the same time by overcoming deterioration of thermal stability due to a high coefficient of thermal expansion of an insulating material of a substrate.

Further, it is another object of the present invention to provide an insulating prepreg or an insulating film using an insulating composition.

Further, it is still another object of the present invention to provide a substrate including an insulating prepreg or an insulating film.

In accordance with one aspect of the present invention to achieve the object, there is provided an insulating composition for a substrate including a soluble liquid crystal thermosetting oligomer, a metal alkoxide, a graphene oxide, and a short fiber.

It is preferred that the soluble liquid crystal thermosetting oligomer is a compound represented by the following chemical formula 1.

Chemical Formula 1

In the above formula, $R_1$ and $R_2$ are $CH_3$ or H, and at least one of the $R_1$ and the $R_2$ is $CH_3$.

$Ar_1$ is a divalent aromatic organic group with a molecular weight of less than 5,000, which includes one or more structural units selected from the group consisting of ester, amide, ester amide, ester imide, and ether imide.

The $Ar_1$ includes one or more structural units selected from the group represented by the following chemical formula 2.

Chemical Formula 2

-continued

In the above formula, $Ar_2$, $Ar_4$, $Ar_5$, and $Ar_6$ are divalent aromatic organic groups and include one or more structural units selected from the group represented by the following chemical formula 3.

$Ar_a$ is a tetravalent aromatic organic group and includes one or more structural units selected from the group represented by the following chemical formula 4.

n and m are integers from 1 to 100.

Chemical Formula 3

Chemical Formula 4

-continued

It is preferred that a number average molecular weight of the soluble liquid crystal thermosetting oligomer is 500 to 15,000.

Metal of the metal alkoxide may be at least one selected from the group consisting of Ti, Al, Ge, Co, Ca, Hf, Fe, Ni, Nb, Mo, La, Re, Sc, Si, Ta, W, Y, Zr, and V.

The metal alkoxide may include a reaction group that can be covalently bonded with a thermosetting group included in the soluble liquid crystal thermosetting oligomer.

The reaction group may be at least one selected from the group consisting of a vinyl group, an acrylic group, a methacrylic group, a mercapto group, and combinations thereof.

The graphene oxide may have at least one functional group among a hydroxyl group, a carboxyl group, and an epoxy group on a surface and an edge thereof.

It is preferred that the graphene oxide has a ratio of carbon atoms to oxygen atoms (carbon/oxygen ratio) of 1 to 20.

It is preferred that the short fiber has a fiber length of 1 to 10 mm.

The short fiber may be at least one selected from the group consisting of a glass fiber, kevlar, a carbon fiber, and alumina.

In the insulating composition for a substrate, the metal alkoxide may be included in an amount of 0.01 to 50 parts by weight based on the weight of the soluble liquid crystal thermosetting oligomer, the graphene oxide may be included in an amount of 0.01 to 50 parts by weight based on the mixed weight of the soluble liquid crystal thermosetting oligomer and the metal alkoxide, and the short fiber may be included in an amount of 0.01 to 50 parts by weight based on the mixed weight of the soluble liquid crystal thermosetting oligomer, the metal alkoxide, and the graphene oxide.

The soluble liquid crystal thermosetting oligomer may additionally include an epoxy resin in a main chain thereof.

The epoxy resin may be included in an amount of 0.01 to 50 parts by weight based on 100 parts by weight of the soluble liquid crystal thermosetting oligomer.

The soluble liquid crystal thermosetting oligomer, the metal alkoxide, and the graphene oxide may have an organic/inorganic hybrid structure by forming a covalent bond with each other through a curing reaction.

The covalent bond may be formed between the soluble liquid crystal thermosetting oligomer and the graphene oxide, between the epoxy resin and the graphene oxide, between the metal alkoxide and the graphene oxide, and between the graphene oxide and the graphene oxide.

The metal alkoxide and the graphene oxide may be included separately or as composite nano inorganic fillers formed by a condensation reaction thereof.

Further, in accordance with another aspect of the present invention to achieve the object, there is provided an insulating prepreg or an insulating film using an insulating composition.

Further, in accordance with still another aspect of the present invention to achieve the object, there is provided a substrate including an insulating prepreg or an insulating film.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, preferable embodiments of the present invention will be described in detail with reference to the accompanied drawings.

Terms used herein are provided to explain embodiments, not limiting the present invention. Throughout this specification, the singular form includes the plural form unless the context clearly indicates otherwise. Further, terms "comprises" and/or "comprising" used herein specify the existence of described shapes, numbers, steps, operations, members, elements, and/or groups thereof, but do not preclude the existence or addition of one or more other shapes, numbers, operations, members, elements, and/or groups thereof.

The present invention relates to an insulating composition, which has a low coefficient of thermal expansion by curing a graphene oxide and a metal alkoxide with a soluble liquid crystal thermosetting oligomer and high strength and rigidity by adding a short fiber, and a printed circuit board including the insulating composition as an insulating material.

A polymer in accordance with the present invention is a soluble liquid crystal thermosetting oligomer with excellent thermal (CTE), electrical, and mechanical stability or a soluble liquid crystal thermosetting oligomer obtained by adding a small amount of epoxy to a main chain of the above soluble liquid crystal thermosetting oligomer.

This soluble liquid crystal thermosetting oligomer of the present invention may be represented by the following chemical formula 1.

Chemical Formula 1

In the above formula, $R_1$ and $R_2$ are $CH_3$ or H, and at least one of the $R_1$ and the $R_2$ is $CH_3$.

$Ar_1$ is a divalent aromatic organic group with a molecular weight of less than 5,000, which includes one or more structural units selected from the group consisting of ester, amide, ester amide, ester imide, and ether imide.

The $Ar_1$ includes one or more structural units selected from the group represented by the following chemical formula 2.

Chemical Formula 2

-continued

In the above formula, $Ar_2$, $Ar_4$, $Ar_5$, and $Ar_6$ are divalent aromatic organic groups and include one or more structural units selected from the group represented by the following chemical formula 3.

$Ar_a$ is a tetravalent aromatic organic group and includes one or more structural units selected from the group represented by the following chemical formula 4.

n and m are integers from 1 to 100.

Chemical Formula 3

Chemical Formula 4

It is preferred that a number average molecular weight of the soluble liquid crystal thermosetting oligomer represented by the chemical formula 1 is 500 to 15,000. When the molecular weight of the soluble liquid crystal thermosetting oligomer is less than 500, physical properties may be brittle due to an increase in crosslinking density, and when the molecular weight of the soluble liquid crystal thermosetting oligomer exceeds 15,000, it may be disadvantageous when being impregnated into a glass fiber woven fabric due to an increase in viscosity of a solution.

Further, the polymer resin in accordance with the present invention may be a soluble liquid crystal thermosetting oligomer obtained by adding an epoxy resin to a main chain of the above soluble liquid crystal thermosetting oligomer.

At this time, the epoxy resin may be included in an amount of 0.01 to 50 parts by weight based on 100 parts by weight of the soluble liquid crystal thermosetting oligomer. Further, the epoxy resin is not particularly limited, for example, a bisphenol-A type epoxy resin, a naphthalene-modified epoxy resin, a cresol novolac epoxy resin, a rubber-modified epoxy resin, and so on. It is possible to use these materials independently or by mixing at least two of them but not particularly limited thereto.

An example of the soluble liquid crystal thermosetting oligomer in accordance with the present invention is as shown in the following chemical formula 5.

Chemical Formula 5

As in the above chemical formula 5, the soluble liquid crystal thermosetting oligomer in accordance with the present invention is characterized by including a soluble structure A soluble in one or more solvents and a group B with excellent processability in the main chain thereof to be soluble in a typical solvent and by having thermally curable functional groups D at both ends thereof as well as a functional group C which can implement liquid crystal properties.

Methods of preparing the soluble liquid crystal thermosetting oligomer are not particularly limited. The soluble liquid crystal thermosetting oligomer can be prepared by reacting compounds which can prepare a liquid crystal oligomer including a soluble structural unit through polymerization with compounds which can introduce a thermosetting group.

The compounds which can prepare a liquid crystal oligomer including a soluble structural unit are not particularly limited. For example, the compounds may be one or more selected from the group consisting of aromatic, heteroaromatic or aliphatic dicarboxylic acid; aromatic, heteroaromatic or aliphatic diol; aromatic, heteroaromatic or aliphatic diamine; aminophenol; hydroxybenzoic acid; and aminobenzoic acid, preferably, aromatic, heteroaromatic or aliphatic diol; aminophenol; and aminobenzoic acid.

For example, the liquid crystal thermosetting oligomer may be prepared by solution polymerization or bulk polymerization. The solution polymerization and the bulk polymerization may be performed in one reaction tank provided with a suitable stirring means.

Since the soluble liquid crystal thermosetting oligomer having the above structure has a much lower coefficient of thermal expansion than the epoxy resin used as an insulating polymer in the past and includes various functional groups, it is advantageous in forming a hybrid composite structure with other components included in the insulating composition.

In accordance with the present invention, in order to reduce the coefficient of thermal expansion of the insulating composition, an inorganic filler using a graphene oxide and a metal alkoxide is used, with the soluble liquid crystal thermosetting oligomer.

Since the graphene oxide and the metal alkoxide used as additives include a functional group which can form a covalent bond with the soluble liquid crystal thermosetting oligomer, it is possible to form an insulating material having a hybrid structure by the covalent bond between the soluble liquid crystal thermosetting oligomer and the additives.

The reaction group which can form a covalent bonding may be one or more selected from the group consisting of a vinyl group, an acrylic group, a metacrylic acid, a mercapto group, and combinations thereof, and the metal alkoxide with the reaction group which can form the covalent bond may be, for a concrete examples, compounds represented by the following chemical formulas 6 to 9 but not particularly limited thereto.

Chemical Formula 6

In the above formula, R3 to R5 may be each independent alkyl groups with at least one carbon atom, for example, a methane group, an ethane group, a propane group, and so on.

Chemical Formula 7

In the above formula, R6 to R8 may be each independent alkyl groups with at least one carbon atom, for example, a methane group, an ethane group, a propane group, and so on.

Chemical Formula 8

In the above formula, R9 to R11 may be each independent alkyl groups with at least one carbon atom, for example, a methane group, an ethane group, a propane group, and so on.

Chemical Formula 9

In the above formula, R12 to R14 may be each independent alkyl groups with at least one carbon atom, for example, a methane group, an ethane group, a propane group, and so on.

The metal alkoxide having a reaction group which can form a covalent bond may be used independently or the metal alkoxides having several reaction groups may be mixed and then used.

Further, a metal component included in the metal alkoxide in accordance with the present invention may be at least one selected from the group consisting of Ti, Al, Ge, Co, Ca, Hf, Fe, Ni, Nb, Mo, La, Re, Sc, Si, Ta, W, Y, Zr, and V. That is, other metals may be variously displaced instead of Si of the chemical formulas 6 to 9.

It is preferred that this metal alkoxide is included in an amount of 0.01 to 50 parts by weight based on the weight of the soluble liquid crystal thermosetting oligomer. When the amount of the metal alkoxide is less than 0.01 parts by weight, a reduction in the coefficient of thermal expansion is insufficient. Further, when the amount of the metal alkoxide exceeds 50 parts by weight, it is not preferred since the insulating composition breaks easily and cracks.

Figure 5:
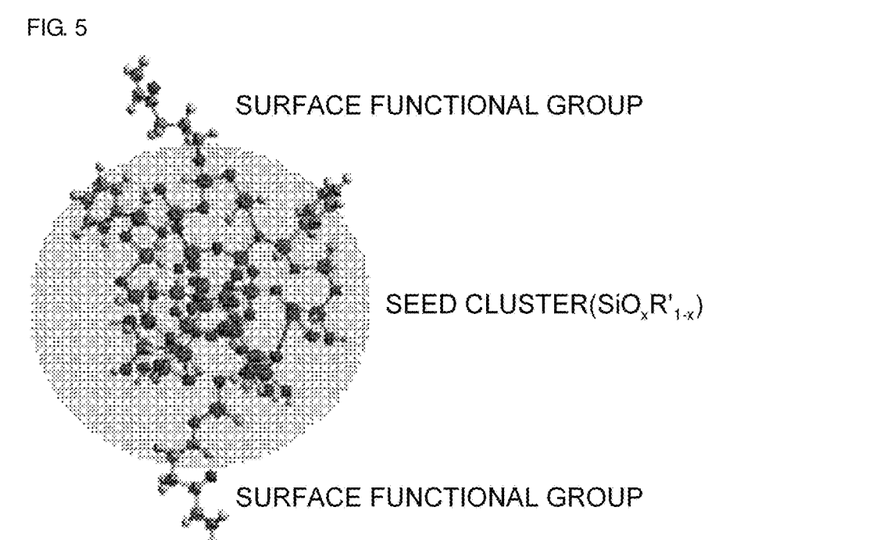
FIG. 5 shows a structure of a metal alkoxide having a covalent bond group.

As shown in FIG. 5, the metal alkoxide in accordance with the present invention has a structure consisting of a seed cluster (inner portion of a circle) formed from the metal alkoxide and a surface functional group (outer portion of a circle) to form a covalent bond with a thermosetting group of the soluble liquid crystal thermosetting oligomer. In addition, unlike FIG. 5, it is possible to form a heterogeneous film by forming only a seed cluster without a surface functional group and dispersing the metal alkoxide in the soluble liquid crystal thermosetting oligomer.

Therefore, when the metal alkoxide is dispersed in the soluble liquid crystal thermosetting oligomer matrix, a nanoscale metal alkoxide cluster is formed in-situ so that the formed cluster and the groups at both ends of the soluble liquid crystal thermosetting oligomer form a covalent bond. That is, the reaction group which is strongly covalent-bonded with the cluster formed when a curing reaction of the soluble liquid crystal thermosetting oligomer as a main matrix is performed directly participates in the reaction to form the strong covalent bond between the soluble liquid crystal thermosetting oligomer matrix and an inorganic cluster (refer to FIG. 8). The mobility of a polymer chain, which is a main cause of thermal expansion, can be greatly reduced by forming this strong covalent bond, and consequently, the coefficient of thermal expansion of the insulating layer is reduced.

Further, the graphene oxide is added to the insulating composition of the present invention with the metal alkoxide. The graphene oxide has a low coefficient of thermal expansion and excellent mechanical properties. Therefore, it is possible to improve properties of the polymer resin by addition of a smaller amount of the graphene oxide than the inorganic filler such as silica which is commonly added to improve mechanical properties of the polymer resin.

The graphene oxide may be prepared by oxidizing graphite, and graphite has a layered structure in which graphene, a plate structure formed by connecting carbon atoms in a hexagonal ring, is stacked. Generally, since a distance between the layers is 3.35 Å and graphite has a structure in which carbon nanotubes are spread in plate state, graphite has high conductivity corresponding to carbon nanotube and excellent mechanical properties.

When graphite powder is oxidized, each layer of graphite is oxidized while maintaining a layered structure to obtain graphene oxide powder having at least one functional group of a hydroxyl group, a carboxyl group, and an epoxy group attached to a surface and an edge thereof.

The graphene oxide powder may be prepared by oxidizing graphite powder by an oxidant or an electrochemical method. The oxidant may be, for example, nitric acid, $NaClO_3$, or $KMnO_4$ but not limited thereto. It is possible to use these materials independently or by mixing two or more of them.

It is preferred that the graphene oxide in accordance with the present invention is sufficiently oxidized not to deteriorate insulating properties of the polymer resin. That is, it is preferred that the graphene oxide is sufficiently oxidized to have almost no electrical conductivity or completely lose the electrical conductivity. For this, a ratio of carbon atoms to oxygen atoms (carbon/oxygen ratio) of the graphene oxide may be changed according to a degree of oxidation, preferably, 1 to 20.

Figure 6:
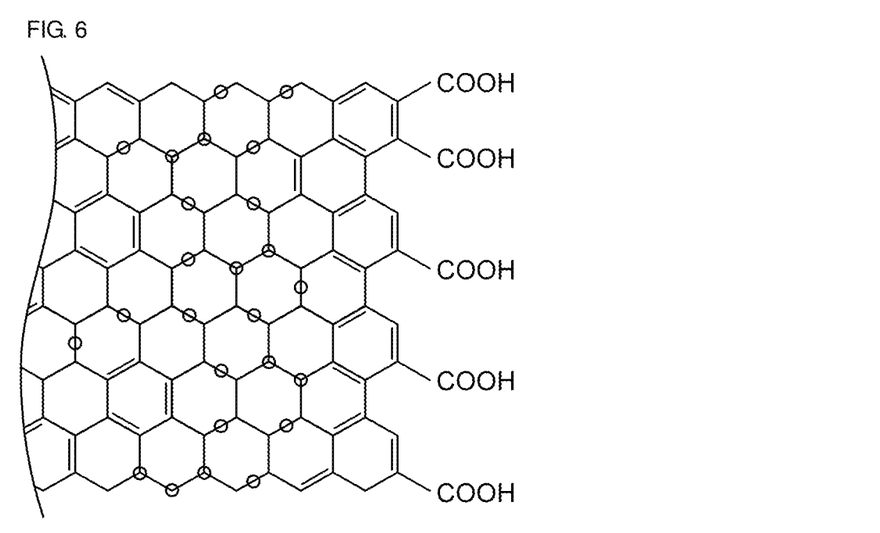
FIG. 6 shows a structure of a graphene oxide.

A portion of the structure of the graphene oxide in accordance with the present invention is schematically shown in FIG. 6. The graphen oxide includes a plurality of functional groups such as a hydroxyl group, an epoxy group, and a carboxyl group on a surface and an edge thereof. The kind and number of the functional groups may be changed according to an oxidation method or the degree of oxidation of the graphene oxide.

Therefore, when the graphene oxide is added to the insulating composition of the present invention, the graphene oxide can be physically dispersed in the cured product of the soluble liquid crystal thermosetting oligomer and form a chemical bond with the polymer resin by the functional groups. The graphene oxide having the function groups can form a covalent bond with the soluble liquid crystal thermosetting oligomer by the curing reaction and thus be a composite which is organically connected to the soluble liquid crystal thermosetting oligomer resin.

Similar to the metal alkoxide cluster, it may be possible to form a heterogeneous film by mixing and dispersing the graphene oxide in the main chain or the main chain to which the additives are added without a covalent bond process.

It is preferred that the graphene oxide is included in an amount of 0.01 to 50 parts by weight based on the mixed weight of the soluble liquid crystal thermosetting oligomer and the metal alkoxide. When the amount of the graphene oxide is less than 0.01 parts by weight, a reduction in the coefficient of thermal expansion is insufficient, and further, when exceeding 50 parts by weight, it is not preferred since a thickness is too small due to a reduction in viscosity.

In the present invention, it is possible to increase a critical amount of the organic filler additives by additionally adding the graphene oxide with insulating properties. This is because the graphene oxide used in the present invention has a wider particle size distribution than the conventionally used inorganic filler additives, that is, in the range of nm to μm. In the conventional methods, inorganic fillers of the alkoxide should be formed with a size of nanometer (nm) between the liquid crystal thermosetting oligomers, but in the present invention, it is possible to increase the critical amount of the inorganic filler by adding the graphene oxide with a size of nm to μm to increase a gap between the main chain and the metal alkoxide than before.

Consequently, the soluble liquid crystal thermosetting oligomer, the metal alkoxide, and the graphene oxide included in the insulating composition of the present invention have a hybrid structure by forming a covalent bond with each other by a curing reaction.

Figure 7:
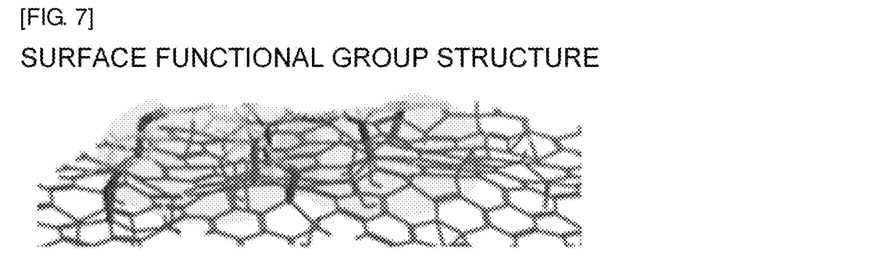
FIG. 7 is a conceptual view showing a state in which a graphene oxide, a metal alkoxide, and a soluble liquid crystal thermosetting oligomer in accordance with an embodiment of the present invention form an organic/inorganic hybrid structure.

As can be seen from FIG. 7, the organic-inorganic printed board insulating material of the present invention is a homogeneous organic-inorganic composite material formed by the covalent bond between the LCT matrix (chemical formula 1, LCP resin) and the metal cluster formed from the graphene oxide cluster and the metal alkoxide cluster ($SiO_xR'_{1-x}$ cluster) by a condensation reaction.

The covalent bond may be formed between the soluble liquid crystal thermosetting and the graphene oxide, between the epoxy resin and the graphene oxide, between the metal alkoxide and the graphene oxide, and between the graphene oxide and the graphene oxide.

Further, in addition to the covalent bond, curing of the soluble liquid crystal thermosetting oligomer, curing of the epoxy resin, and so on may be accompanied together. With this, it is possible to check that the insulating composition in accordance with the present invention has a net structure in which components are organically connected to each other.

In accordance with an embodiment of the present invention, the metal alkoxide and the graphene oxide may be added to the insulating composition separately or as composite nano inorganic fillers prepared by a condensation reaction thereof.

Meanwhile, the insulating composition in accordance with the present invention can reduce the coefficient of thermal expansion by the addition of the metal alkoxide and the graphene oxide and improve strength and rigidity of the insulating layer by adding a short fiber.

The short fiber in accordance with the present invention is a short fiber with a fiber length of 0.5 to 10 mm. When the length of the short fiber is less than 0.5 mm, it is not preferred since improvement of mechanical properties is slight due to a low slenderness ratio. Further, when the length of the short fiber exceeds 10 mm, it is not preferred since a reinforcing effect does not occur properly due to a difficulty of mixing and non-uniform distribution of the short fiber when the short fiber is dispersed in the insulating polymer resin.

The short fiber may be at least one selected from the group consisting of a glass fiber, kevlar, a carbon fiber, and alumina.

It is preferred that the short fiber is included in an amount of 0.01 to 50 parts by weight based on the mixed weight of the soluble liquid crystal thermosetting oligomer, the metal alkoxide, and the graphene oxide.

When the amount of the short fiber is less than 0.01 parts by weight, a mechanical reinforcing effect does not occur. Further, when exceeding 50 parts by weight, it is not preferred since there may occur several problems when processing a substrate due to a difficulty of dispersion.

Further, a solvent used when preparing the insulating composition in accordance with the present invention is not particularly limited and, for example, may be selected from the group consisting of N,N-dimethylacetamide, N-methylpyrrolidone (NMP), N-methylcaprolactone, N,N-dimethylformamide, N,N-diethylformamide, N,N-diethylacetamide, N-methylpropionamide, dimethylsulfoxide, gamma-butyllactone, dimethylimidazolidinone, tetramethylphosphoric amide, and ethylcellosolve acetate. It is possible to selectively use a mixed solvent of two or more of them.

The insulating composition of the present invention may additionally include one or more additives such as a filler, a softner, a plasticizer, a lubricant, an antistatic agent, a coloring agent, an antioxidant, a heat stabilizer, a light stabilizer, and a UV absorber according to needs.

Examples of the filler may include organic fillers such as epoxy resin powder, melamine resin powder, urea resin powder, benzoguanamine resin powder, and styrene resin; and inorganic fillers such as silica, alumina, titanium oxide, zirconia, kaolin, calcium carbonate, and calcium phosphate.

The present invention may provide a substrate including the insulating composition as an insulating material. The insulating composition in accordance with the present invention, a composite material having an organic-inorganic hybrid structure, has excellent thermal properties and mechanical properties such as strength and rigidity and can be widely utilized as a substrate.

The insulating material in accordance with the present invention can be used by impregnating the insulating composition in a woven glass fiber fabric to form it into a prepreg or forming the insulating composition into a build-up film itself.

Figure 8:
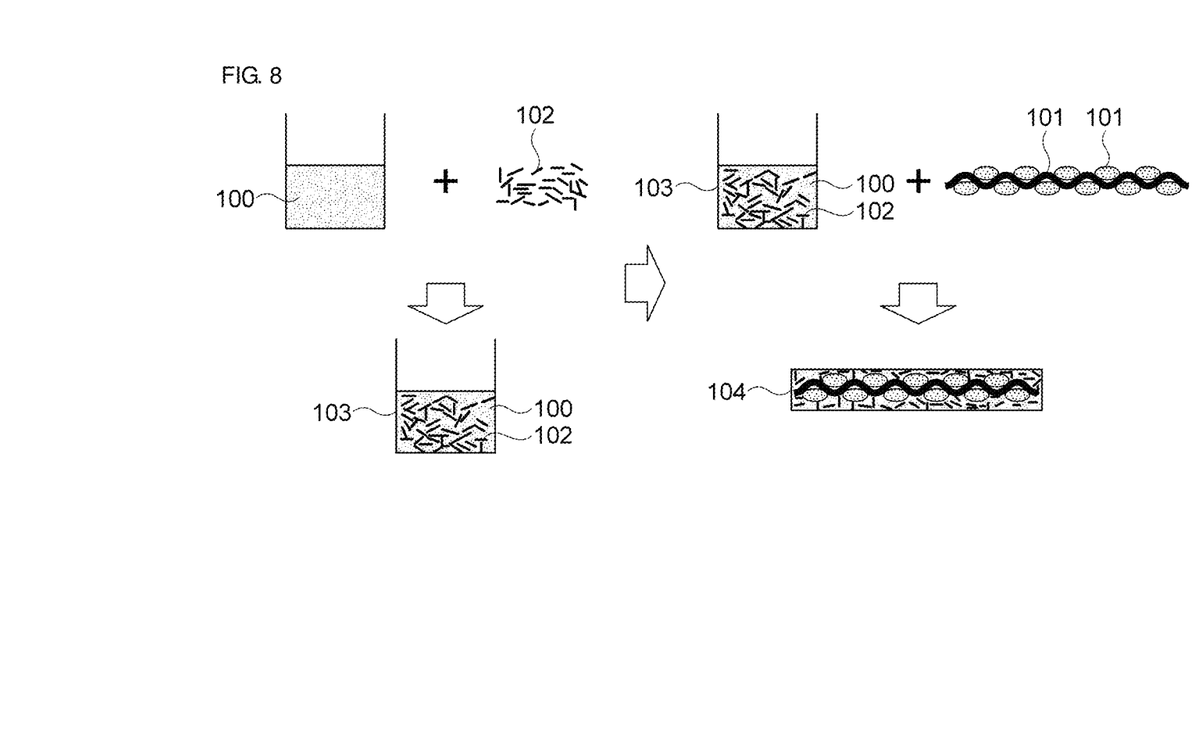
FIG. 8 is a process conceptual view showing a state in which an insulating composition in accordance with an embodiment of the present invention is impregnated into a glass fabric.

In the insulating composition in accordance with the present invention, as in FIG. 8, a short fiber 102 is added to a solution 100 in which a soluble liquid crystal thermosetting oligomer (LCT resin), a graphene oxide, and a metal alkoxide are mixed to prepare an insulating resin 103 in which the short fiber is dispersed.

Next, a prepreg 104, an insulating material to which the short fiber is reinforced, is prepared by impregnating the insulating resin 103 in an appropriate reinforcing agent 101. The reinforcing agent used at this time is not particularly limited, for example, woven glass cloth, woven alumina glass cloth, nonwoven glass fabric, nonwoven cellulose fabric, woven carbon cloth, and polymer cloth. Further, methods of impregnating the insulating composition in the reinforcing agent may include dip coating, roll coating, and so on, and other typical impregnation methods can be used.

Continuously, the prepreg is dried at appropriate temperature and time, laid up with a copper foil and so on, and cured to be formed into a sheet.

Further, since the insulating composition in accordance with the present invention has high adhesive strength to the copper foil and exhibits high heat resistance, low expansion, and excellent mechanical properties, it can be used as an excellent packaging material. The insulating composition can be formed into a substrate or a varnish for impregnation or coating. The composition can be applied to a printed circuit board, each layer of a multilayer substrate, a copper clad laminate (for example, RCC, CLL), and a TAB film, but the purpose of the insulating composition is not limited thereto.

Embodiment 1

25 g of N-methyl-2-pyrrolidone (NMP) is put in 100 g of a soluble liquid crystal thermosetting oligomer (number average molecular weight 7500 to 9000) having a structure of the chemical formula 5, which is prepared by mixing and reacting aminophenol, isophthalic acid, naphthoic acid, hydroxybenzoic acid, and nadimido benzoic acid in a 100 ml flask with a condenser and a stirrer with a molar ratio of 2:1:2:2:2 and stirred while gradually increasing a temperature to 90° C. to dissolve the soluble liquid crystal thermosetting oligomer.

Continuously, trimethoxyvinyl silane and tetraethylorthosilicate as metal alkoxides are mixed in the soluble liquid crystal thermosetting oligomer solution with a molar molecular ratio of 1:5 and added in an amount of 30 parts by weight based on the soluble liquid crystal thermosetting oligomer.

Further, 2 parts by weight of a graphene oxide (carbon/oxygen ratio=11 to 20) is added based on the mixed weight of the soluble liquid crystal thermosetting oligomer and the metal alkoxides.

Further, 20 parts by weight of a glass short fiber (E 1082, length 3 mm) is added and stirred based on the mixed weight of the soluble liquid crystal thermosetting oligomer, the metal alkoxides, and the graphene oxide to prepare an insulating composition.

The prepared insulating composition is impregnated into a woven glass fiber (1080 glass fiber) to prepare a prepreg.

Reference Example

A prepreg (Doosan Electronics 1080 glass fiber), which is available on the market, is used as a reference.

Comparative Example 1

A prepreg is prepared by impregnating only the soluble liquid crystal thermosetting oligomer of the embodiment 1 in a woven glass fiber.

Comparative Example 2

In the embodiment 1, a prepreg is prepared by impregnating an insulating composition, which consists of a soluble liquid crystal thermosetting oligomer and a metal alkoxide, in a woven glass fiber.

Comparative Example 3

In the embodiment 1, a prepreg is prepared by impregnating an insulating composition, which consists of a soluble liquid crystal thermosetting oligomer, a metal alkoxide, and a graphene oxide, in a woven glass fiber.

Experimental Example 1

Identification of Thermal Properties

The prepregs prepared in the embodiment 1, the reference example, and the comparative examples 1 to 3 are compressed and formed into films and thermal properties and the coefficient of thermal expansion (CTE) thereof are measured using TA TMA Q400. The results thereof are shown in the following table 1 and FIGS. 9 to 11. The measurement was performed at a heating rate of 10° C./min in a state of being purged with nitrogen. A low temperature coefficient of thermal expansion is a mean value measured in the range of 50 to 100° C.

Experimental Example 2

Identification of Strength and Rigidity

The prepregs prepared in the embodiment 1, the reference example, and the comparative examples 1 to 3 are compressed, obtained as films, and formed in a dumbbell shape

TABLE 1

| Unit: μm/° C. (ppm/° C.) | CTE × ($10^{-6}$ °C.) | | Rigidity (Young's Modulus, GPa) | | | | |
|---|---|---|---|---|---|---|---|
| | 50~100° C. | CTE reduction (%) | Measurement 1 | Measurement 2 | Measurement 3 | Measurement Average | Rigidity increase (%) |
| Reference Example 1 (Doosan 7402 PPG) | 15 | 0 (reference) | 22.5 | 22.5 | 22.6 | 22.5 | 0 (reference) |
| Comparative Example 1 (LCT + PPG impregnated into glass fiber) | 9.2 | 38% | 28.0 | 27.0 | 27.6 | 27.5 | 22% |
| Comparative Example 2 (LCT + metal alkoxide + PPG impregnated into glass fiber) | 8.1 | 46% | 28.6 | 28.7 | 28.1 | 28.4 | 26% |
| Comparative Example 3 (LCT + graphene oxide + metal alkoxide + PPG impregnated into glass fiber) | 7.4 | 50% | 29.1 | 28.9 | 28.5 | 28.8 | 28% |
| Embodiment 1 (LCT + graphene oxide + metal alkoxide + short fiber + PPG impregnated into glass fiber) | 6.3 | 58% | 29.6 | 30.1 | 30.4 | 30.0 | 33% |

As in the results of the table 1, the prepregs, which are prepared using the insulating composition including only the soluble liquid crystal thermosetting oligomer (comparative example 1), the insulating composition including the soluble liquid crystal thermosetting oligomer and the metal alkoxide (comparative example 2), and the insulating composition including the soluble liquid crystal thermosetting oligomer, the metal alkoxide, and the graphene oxide, have a slightly lower coefficient of thermal expansion than 15 μm/° C. which is the coefficient of thermal expansion of a material on the market (reference example), but effective improvement of the coefficient of thermal expansion is still insufficient.

However, it is possible to check that the prepreg prepared using the insulating composition in accordance with the embodiment 1 of the present invention, which includes the short fiber in the soluble liquid crystal thermosetting oligomer, the metal alkoxide, and the graphene oxide, can reduce the coefficient of thermal expansion by 58% compared to the material on the market (reference example).

Figure 9:
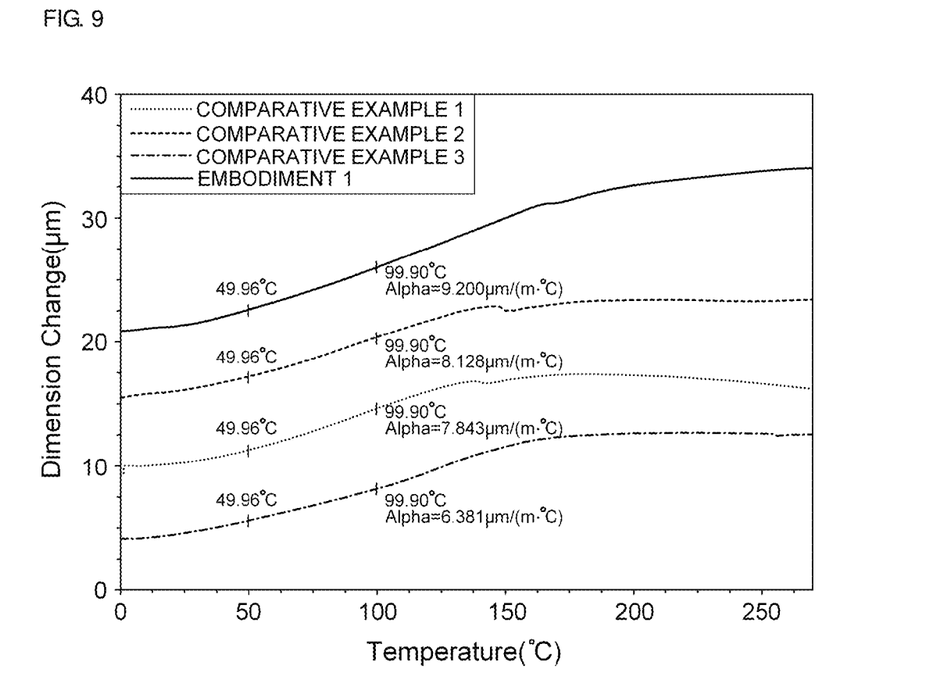
FIG. 9 is a graph showing the results of TMA measurement at low temperature of insulating materials in accordance with comparative examples 1 to 3 and an embodiment 1.
Figure 10:
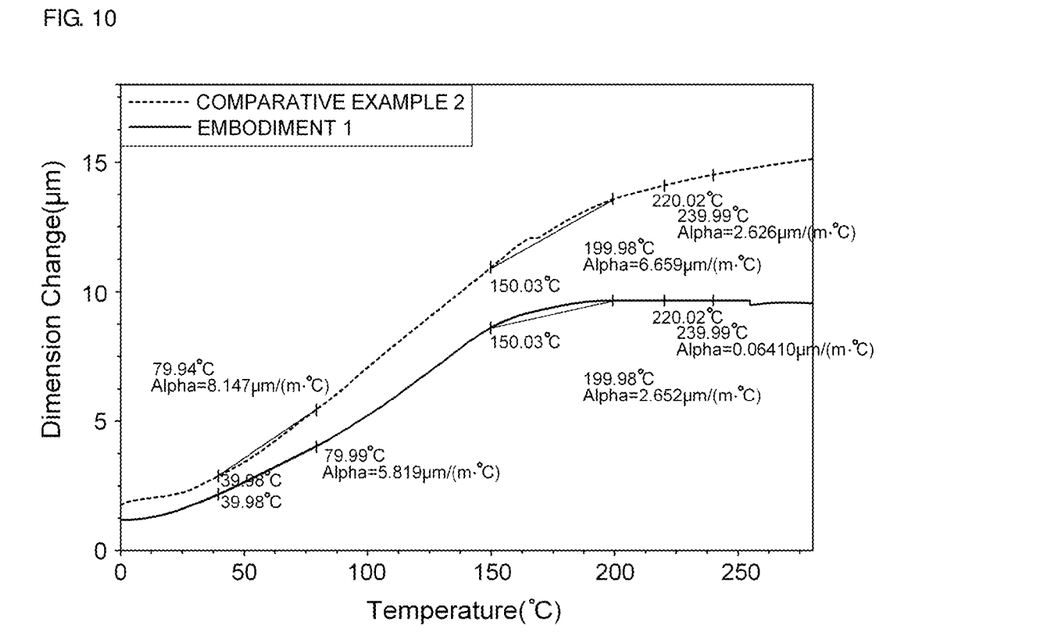
FIG. 10 is a graph showing the results of the TMA measurement in the entire temperature range of the insulating materials in accordance with a comparative example 2 and the embodiment 1.
Figure 11:
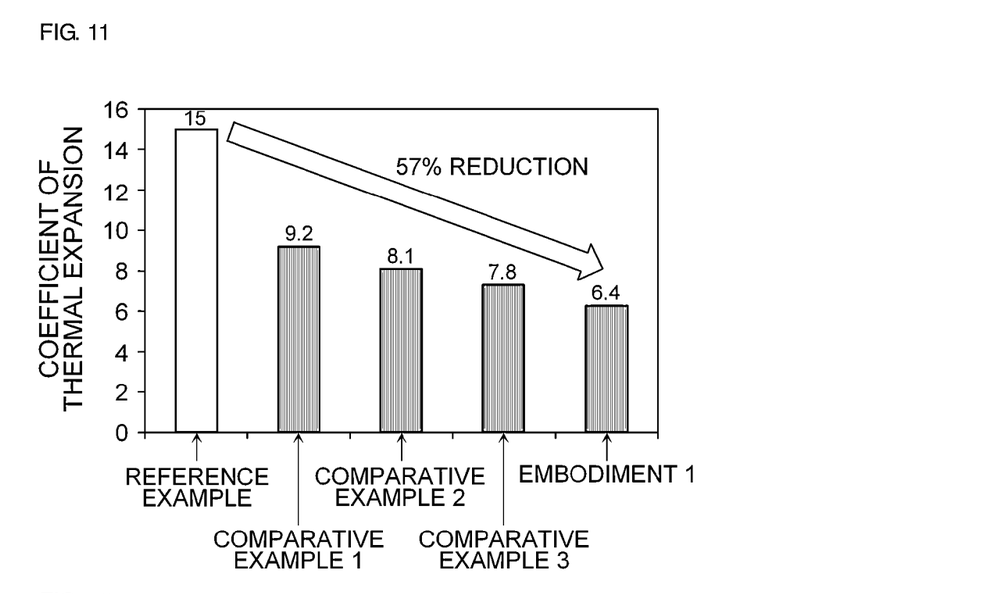
FIG. 11 is a graph showing changes in the coefficient of thermal expansion calculated from the results of the TMA measurement of the insulating materials in accordance with a reference example, the comparative examples 1 to 3, and the embodiment 1.

Further, as can be seen from FIGS. 9 to 10 showing the results of TMA, it is possible to check that thermal stability of the prepreg prepared using the insulating composition in accordance with the embodiment 1 of the present invention is far superior to the comparative examples 1, 2, and 3. Especially, improvement of 58% reduction is checked compared to the conventional reference expansion on the market (Doosan 7402 PPG). Further, FIG. 9 observes changes in the dimensions of samples of the reference example, the comparative examples 1, 2, and 3, and the embodiment 1 in the range of 0 to 100° C., and FIG. 10 observes changes in the dimensions of the samples of the comparative example 2 and the embodiment 1 in the range of 0 to 250° C. It is possible to check that reduction in the coefficient of thermal expansion is effectively performed in the sample of the embodiment 1 of the present invention.

and strength and rigidity thereof are measured using a tensile strength tester. The results thereof are shown in the above table 1 and FIGS. 12 to 14.

Figure 12:
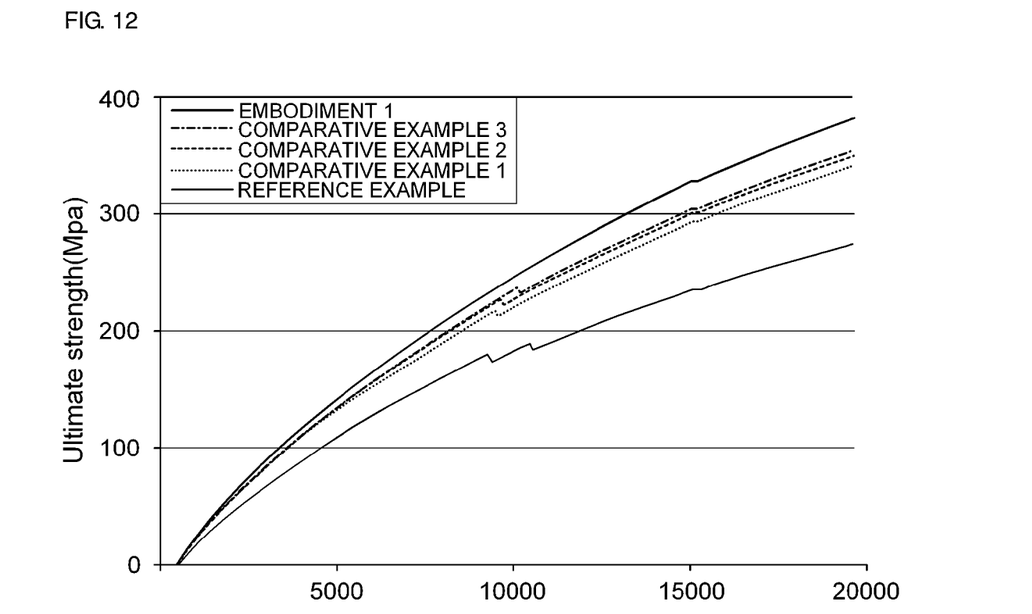
FIG. 12 shows the results of a tensile test of the insulating materials in accordance with the reference example, the comparative examples 1 to 3, and the embodiment 1.
Figure 13:
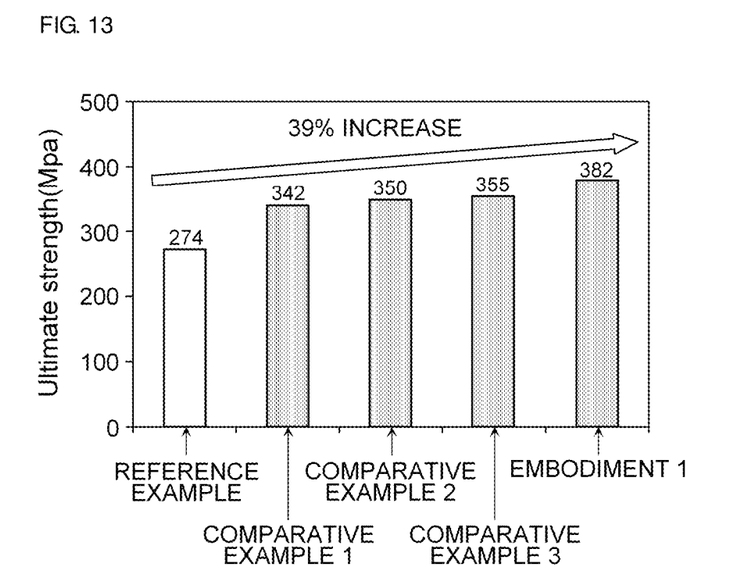
FIG. 13 is a graph showing changes in strength calculated from the results of the tensile test of FIG. 12.
Figure 14:
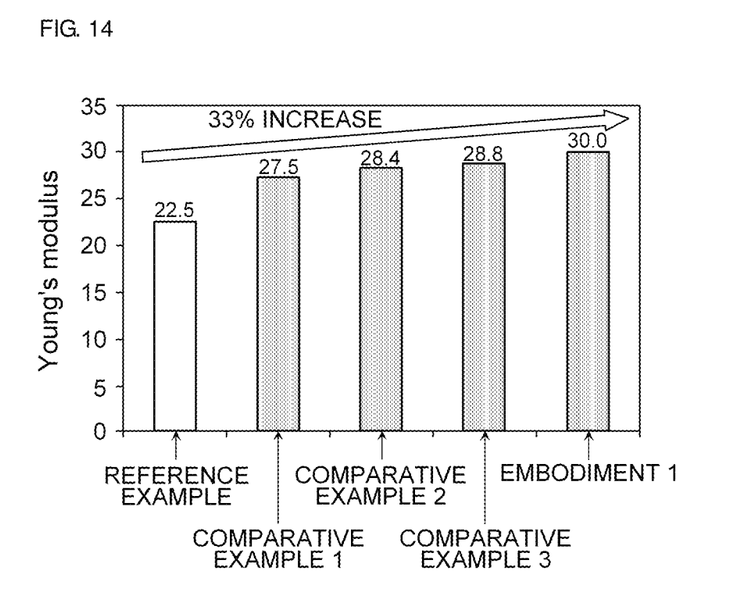
FIG. 14 is a graph showing changes in rigidity calculated from the results of the tensile test of FIG. 12.

As in the table 1 and FIGS. 12 to 14, it is possible to check that the strength and rigidity of the prepreg prepared using the insulating composition in accordance with the embodiment 1 of the present invention are far superior to the product on the market (reference example) and improved compared to the comparative examples 1, 2, and 3.

Especially, the strength is improved by 39% and the rigidity is improved by 33% compared to the conventional reference example (Doosan 7402 PPG) on the market.

Therefore, the insulating composition in accordance with the present invention can effectively reduce the coefficient of thermal expansion by including the soluble liquid crystal thermosetting oligomer, the insulating graphene oxide, and the metal alkoxide and forming an organic/inorganic hybrid structure in which the graphene oxide, the polymer resin, and the metal alkoxide are organically connected to each other through a curing reaction or a covalent bond reaction therebetween, and improve the strength and rigidity of the insulating material by additionally including the short fiber.

The present invention can remarkably reduce the coefficient of thermal expansion by using a soluble liquid crystal thermosetting oligomer with a much lower CTE than an epoxy resin or a soluble liquid crystal thermosetting oligomer in which a small amount of epoxy is added to a main chain thereof as a main matrix and using an insulating graphene oxide and a metal alkoxide. Therefore, it is possible to provide a substrate material with greatly increased strength and rigidity by addition of a short fiber as well as to manufacture a substrate with improved thermal stability by using the present invention as an insulating material of the substrate to minimize dimensional deformation due to heat.

The invention claimed is:

1. An insulating composition for a substrate comprising:
a soluble liquid crystal thermosetting oligomer;
a metal alkoxide;
a graphene oxide; and
a short fiber,
wherein the soluble liquid crystal thermosetting oligomer is a compound represented by the following chemical formula 1, Chemical Formula 1 where $R_1$ and $R_2$ are $CH_3$ or H, and at least one of the $R_1$ and the $R_2$ is $CH_3$, $Ar_1$ is a divalent aromatic organic group with a molecular weight of less than 5,000, which comprises one or more structural units selected from the group consisting of ester, amide, ester amide, ester imide, and ether imide, and the $Ar_1$ comprises one or more structural units selected from the group represented by the following chemical formula 2, Chemical Formula 2 where $Ar_2$, $Ar_4$, $Ar_5$, and $Ar_6$ are divalent aromatic organic groups and comprise one or more structural units selected from the group represented by the following chemical formula 3,

$Ar_a$ is a tetravalent aromatic organic group and comprises one or more structural units selected from the group represented by the following chemical formula 4, and n and m are integers from 1 to 100

Chemical Formula 3

Chemical Formula 4

-continued

2. The insulating composition for a substrate according to claim 1, wherein a number average molecular weight of the soluble liquid crystal thermosetting oligomer is 500 to 15,000.

3. The insulating composition for a substrate according to claim 1, wherein metal of the metal alkoxide is at least one selected from the group consisting of Ti, Al, Ge, Co, Ca, Hf, Fe, Ni, Nb, Mo, La, Re, Sc, Si, Ta, W, Y, Zr, and V.

4. The insulating composition for a substrate according to claim 1, wherein the graphene oxide has at least one functional group among a hydroxyl group, a carboxyl group, and an epoxy group on a surface and an edge thereof.

5. The insulating composition for a substrate according to claim 1, wherein the graphene oxide has a ratio of carbon atoms to oxygen atoms (carbon/oxygen ratio) of 1 to 20.

6. The insulating composition for a substrate according to claim 1, wherein the short fiber has a fiber length of 1 to 10 mm.

7. The insulating composition for a substrate according to claim 1, wherein the short fiber is at least one selected from the group consisting of a glass fiber, kevlar, a carbon fiber, and alumina.

8. The insulating composition for a substrate according to claim 1, wherein the metal alkoxide is included in an amount of 0.01 to 50 parts by weight based on the weight of the soluble liquid crystal thermosetting oligomer,
the graphene oxide is included in an amount of 0.01 to 50 parts by weight based on the mixed weight of the soluble liquid crystal thermosetting oligomer and the metal alkoxide, and
the short fiber is included in an amount of 0.01 to 50 parts by weight based on the mixed weight of the soluble liquid crystal thermosetting oligomer, the metal alkoxide, and the graphene oxide.

9. The insulating composition for a substrate according to claim 1, wherein the metal alkoxide and the graphene oxide are included separately or as composite nano inorganic fillers formed by a condensation reaction thereof.

10. The insulating composition for a substrate according to claim 1, wherein the metal alkoxide comprises a reaction group that can be covalently bonded with a thermosetting group included in the soluble liquid crystal thermosetting oligomer.

11. The insulating composition for a substrate according to claim 10, wherein the reaction group is at least one selected from the group consisting of a vinyl group, an acrylic group, a methacrylic group, a mercapto group, and combinations thereof.

12. The insulating composition for a substrate according to claim 1, wherein the soluble liquid crystal thermosetting oligomer additionally comprises an epoxy resin in a main chain thereof.

13. The insulating composition for a substrate according to claim 12, wherein the epoxy resin is included in an amount of 0.01 to 50 parts by weight based on 100 parts by weight of the soluble liquid crystal thermosetting oligomer.

14. The insulating composition for a substrate according to claim 1, wherein the soluble liquid crystal thermosetting oligomer, the metal alkoxide, and the graphene oxide have an organic/inorganic hybrid structure by forming a covalent bond with each other through a curing reaction.

15. The insulating composition for a substrate according to claim 14, wherein the covalent bond is formed between the soluble liquid crystal thermosetting oligomer and the graphene oxide, between the epoxy resin and the graphene oxide, between the metal alkoxide and the graphene oxide, and between the graphene oxide and the graphene oxide.

16. An insulating prepreg or an insulating film using an insulating composition according to claim 1.

17. A substrate comprising an insulating prepreg or an insulating film according to claim 16.

* * * * *

UNITED STATES PATENT AND TRADEMARK OFFICE
CERTIFICATE OF CORRECTION

PATENT NO. : 9,045,646 B2
APPLICATION NO. : 13/801087
DATED : June 2, 2015
INVENTOR(S) : Soo Young Ji et al.

It is certified that error appears in the above-identified patent and that said Letters Patent is hereby corrected as shown below:

In the Claims

Claim 1, Column 19, Lines 35-37:

Delete "[structure]" and insert --[structure]--, therefor.

Claim 1, Column 19, Lines 58-60:

Delete "[structure]" and insert --[structure]--, therefor.

Claim 1, Column 20, Line 18:

Delete "$Ar_a$" and insert --$Ar_3$--, therefor.

Signed and Sealed this
Twentieth Day of October, 2015

Michelle K. Lee
*Director of the United States Patent and Trademark Office*